(12) United States Patent
Reichert et al.

(10) Patent No.: US 7,833,511 B2
(45) Date of Patent: Nov. 16, 2010

(54) CAPACITOR POWDER

(75) Inventors: Karlheinz Reichert, Wolfenbüttel (DE); Christoph Schnitter, Holle-Sottrum (DE)

(73) Assignee: H.C. Starck GmbH, Goslar (DE)

( * ) Notice: Subject to any disclaimer, the term of this patent is extended or adjusted under 35 U.S.C. 154(b) by 0 days.

(21) Appl. No.: 12/261,635

(22) Filed: Oct. 30, 2008

(65) Prior Publication Data

US 2009/0278095 A1 Nov. 12, 2009

Related U.S. Application Data

(62) Division of application No. 11/004,091, filed on Dec. 3, 2004, now abandoned, which is a division of application No. 10/311,115, filed as application No. PCT/EP01/06525 on Jun. 8, 2001, now Pat. No. 6,992,881.

(30) Foreign Application Priority Data

Jun. 21, 2000 (DE) ................ 100 30 387

(51) Int. Cl.
*C01G 33/00* (2006.01)
*H01G 9/042* (2006.01)

(52) U.S. Cl. ............... 423/594.17; 423/594.8; 361/528

(58) Field of Classification Search ............ 423/594.17, 423/594.8

See application file for complete search history.

(56) References Cited

U.S. PATENT DOCUMENTS

| | | | | |
|---|---|---|---|---|
| 3,203,793 A | * | 8/1965 | Hand | ............ 428/613 |
| 3,564,348 A | | 2/1971 | Cheseldine | |
| 3,710,474 A | * | 1/1973 | Kelly et al. | ............ 428/546 |
| 3,867,129 A | * | 2/1975 | Ronneau et al. | ............ 75/255 |
| 3,984,208 A | | 10/1976 | Moulin et al. | |
| 6,051,044 A | | 4/2000 | Fife | |
| 6,322,912 B1 | * | 11/2001 | Fife | ............ 428/702 |
| 2003/0104923 A1 | * | 6/2003 | Omori et al. | ............ 501/134 |

FOREIGN PATENT DOCUMENTS

DE 2636279 6/1978

OTHER PUBLICATIONS

A.D. Modestov, A.D. Dadydov, "Capacitance and photocurrent study of electronic properties of anodic oxide films on Nb and Ta Evaluation of the ioznized donor concentration profile in $Nb_2O_5$ film." J. Electroanalytical Chem. 1999, 460, pp. 214-225.
F. DiQuarto, et al., "Amorphous Semiconductor-Electrolyte Junction Impedance Study on the $a-Nb_2O_5$-Electrolyte Junction" Electroanalytical Chem. 1990, 35, p. 99.
K.E. Heusler, M. Schulze, "Electron-Transfer Reactions at Semiconducting Anodic Niobium Oxide Films." Electrochim. Acta 1975, 20, p. 237.
M. Grundner, J. Halbritter, "XPS and AES studies on oxide growth and oxide coatings on niobium." J. Appl. Phys. 1980, 51(1), pp. 397-405.
N. F. Jackson, J.C. Hendy, "The Use of Niobium as an Anode Material in Liquid Filled Electrolytic Capacitors." Electrocomponent Science & Tech. 1974, 1, 27-37.
Y. Pozdeev "Comparison of Tantalum and Niobium Solid Electrolytis Capacitors." CARTS-EUROPE '97: 11th European Passive Components Symposium.

* cited by examiner

*Primary Examiner*—Roy King
*Assistant Examiner*—Ngoclan T Mai
(74) *Attorney, Agent, or Firm*—Connolly Bove Lodge & Hutz LLP

(57) ABSTRACT

Disclosed herein are capacitors having an anode based on niobium and a barrier layer based on niobium pentoxide, at least the barrier layer having a content of vanadium and process for their preparation and use.

7 Claims, 1 Drawing Sheet

US 7,833,511 B2

CAPACITOR POWDER

RELATED APPLICATIONS

This application is a divisional application of U.S. patent application Ser. No. 11/004,091, filed Dec. 3, 2004, abandoned, which is a divisional application of U.S. patent application Ser. No. 10/311,115, filed Dec. 16, 2002, now U.S. Pat. No. 6,992,881, which is a national phase application of PCT/EP01/06525, filed Jun. 8, 2001, which claims priority to German application No. 100 30 387.0, filed Jun. 21, 2000.

BACKGROUND OF THE INVENTION

1. Field of the Invention

The present invention relates to a powder for the production of electrolytic capacitors, especially a powder for the production of anodes for electrolytic capacitors.

2. Brief Description of the Prior Art

In the literature, the acid earth metals niobium and tantalum in particular are described as starting materials for the production of such capacitors. The capacitors are produced by sintering the finely divided powders to pellets to produce a structure having a large surface area, anodic oxidation of the surface of those sintered bodies to produce a non-conducting insulating layer (dielectric), and application of the counter electrode in the form of a layer of manganese dioxide or of a conductive polymer. The particular suitability of acid earth metal powders is derived from the high relative permittivity of the pentoxides.

Hitherto, only tantalum powder has gained industrial importance for the production of capacitors. That is based on the one hand on the reproducible producibility of finely divided tantalum powder and, on the other hand, on the fact that the insulating oxide layer of tantalum pentoxide possesses particularly pronounced stability. That is possibly due to the fact that tantalum, unlike niobium, does not form a stable suboxide.

In the course of the rapid development of microelectronics, however, disadvantages of tantalum as to its availability and some of its features are increasingly gaining importance. Tantalum is one of the rare metals (54th position in the natural frequency of the elements in the earth's crust with 2.1 g/t) with few mineable deposits (only hard rock mining) and, moreover, it is found in only very small concentrations in its ores. For example, the tantalum ores typically mined today (e.g. in Australia) often contain less than 0.1% $Ta_2O_5$ (approx. 300 ppm Ta). Niobium, which is in the same group of the PSE above tantalum and is very similar thereto in terms of its behaviour, occurs from 10 to 12 times more frequently than tantalum and its deposits are more favourably mineable (33rd position in the natural frequency of the elements in the earth's crust with 24 g/t). The most important deposits in commercial terms are in Brazil (78% of world reserves), where the ore is mined in opencast pits with over 3% $Nb_2O_5$. Further deposits are to be found in Canada, Nigeria and Zaire. Accordingly, the raw material prices for niobium ore concentrates are markedly lower than for tantalum ore concentrates and, moreover, are not subject to such pronounced fluctuations.

Furthermore, there is a natural growth limit to the achievable specific capacitances for tantalum powder. In order to achieve higher capacitances C in the case of Ta powder, the specific surface area must become larger ($C=\epsilon_o\epsilon_r*A/d$), which at a particular powder particle geometry is accompanied by a reduction in the size of the particles. If the mean particle size, in the case of an anodically produced dielectric layer in the nanometer range, is likewise in the nanometer range, regions of the metal sintered body become "through-anodised". That is to say there is no metallic conductivity between two particles, particularly in thin areas such as, for example, sinter necks. Parts of the anode thus become inactive.

Moreover, the sensitivity of tantalum powders to oxidation increases markedly as the size of the powder particles decreases and the specific surface area increases accordingly.

For those reasons, and owing to the markedly higher dielectric constants of niobium ($\epsilon_r$~42) as compared with tantalum ($\epsilon_r$~27), it has been the aim of many researchers to develop niobium capacitors. However, the use of niobium capacitors has hitherto been reserved for the field of low specific capacitances with a small specific surface area and relatively poor quality. One reason therefor is that pure niobium has two disadvantages in comparison with tantalum with regard to capacitor applications. On the one hand, the tendency of the anodically produced oxide film to field crystallisation is more pronounced than in the case of tantalum. The radial growth rate of crystalline surfaces is, in fact, 1000 times greater than in the case of tantalum under the same conditions of anodisation (N. F. Jackson, J. C. Hendy, *Electrocomponent Science & Techn.* 1974, 1, 27-37). This can, however, for the most part be suppressed by anodisation at a lower temperature (Y. Pozdeev: "Comparison of tantalum and niobium solid electrolytic capacitors" TIC 1997; films must be amorphous, crystalline areas in the film exhibit increased conductivity). The other disadvantage concerns the greater sensitivity of anodically produced $Nb_2O_5$ films to heat treatment.

One step in the production of solid electrolytic capacitors is the application of the semiconducting cathode material $MnO_2$. That is effected by immersing the anode body in manganese nitrate solutions to produce a thin $MnNO_3$ layer, which is subsequently decomposed thermally to $MnO_2$. In that process, the Ta—$Ta_2O_5$ system is exposed to temperatures of from 250 to 450° C. for from 10 to 30 minutes. Such heat treatment may, however, lead to an increase in the frequency-, temperature- and BIAS-dependence of the capacitance. The cause thereof is considered to be that, at temperatures above 300° C., the tantalum substrate is able to draw oxygen atoms from the anodically produced tantalum oxide layer, which leads to an exponential gradient of areas in the oxide film that lack oxygen. Such lacking areas bring about a change in the conducting behaviour of the oxide film from a dielectric to an n-type semiconductor or, if the lacking areas are present in a sufficiently high concentration, to a conductor. That is shown diagrammatically in FIG. 1. The critical conductivity $\sigma_0$ separates the insulating part of the oxide film from the conducting part. If the temperature is increased, the semiconducting layer in the oxide film widens and the effective insulating layer becomes thinner. That causes an increase in capacitance, independently of the temperature-dependence of the dielectric constant. In such a case, the application of an anodic BIAS voltage causes the electrons to move from the lacking areas into the tantalum metal. This results in the formation of an electric double layer, which is defined on the metal side by electrons at the interface and on the semiconductor side by the positive space charge in a boundary layer low in charge carriers (Schottky-Mott barrier). That effects an increase in the gradient of the conductivity gradient and an increase in the effective thickness of the dielectric, which, however, according to $C=\epsilon_o\epsilon_r*A/d$, is associated with a reduction in the capacitance.

While anodically produced oxide films on tantalum are dielectric and exhibit semiconducting regions only at elevated temperatures, anodically produced oxide films on niobium behave like n-type semiconductors even at room temperature (A. D. Modestov, A. D. Dadydov, *J. Electroanalytical Chem.* 1999, 460, pp. 214-225). And, they exhibit a Schottky-barrier at the $Nb_2O_5$/electrolyte interface (K. E. Heusler, M. Schulze, *Electrochim. Acta* 1975, 20, p. 237; F. Di Quarto, S. Piazza, C. Sunseri, *J. Electroanalytical Chem.* 1991, 35, p. 99). The reason therefor may be that niobium, in contrast to tantalum, forms various stable sub-oxides. For example, it is known from the literature that, in the case of oxide films on niobium, only the outer layer consists of $Nb_2O_{5-x}$ (M. Grundner, J. Halbritter, *J. Appl. Phys.* 1980, 51 (1), pp. 397-405), which moreover, is not completely stoichiometric in composition and exhibits an oxygen deficiency x. Between the $Nb_2O_{5-x}$ layer and the niobium metal substrate there is a layer of NbO, since that is the thermodynamically stable phase in contact with the oxygen-saturated niobium metal and not, as in the case of tantalum, the pentoxide (K. E. Heusler, P. Schlüter, *Werkstoffe & Korrosion* 1969, 20(3), pp. 195-199).

The oxygen content of the passive surface layer in the case of niobium is approximately from 3500 to 4500 ppm per $m^2$ specific surface area. When Nb anodes are sintered, the oxygen of the passive surface layer diffuses into the inside of the metal and is uniformly distributed therein. In that process, the thickness of the NbO layer also increases proportionally to the surface area of the powder used, which can very readily be followed on sintered niobium anodes by means of X-ray diffraction. In an extreme case, with very high specific surface areas and accordingly very high oxygen contents in the powder, the result is that the anode body consists mainly of NbO after sintering and not of niobium metal. In contrast to tantalum, however, that oxygen increase does not manifest itself in a significant rise in the residual current of anodes made of such powders.

A further point is that the $MnO_2$ cathode acting as the solid electrolyte acts as an oxygen donor and is able to compensate for the oxygen deficit in the $Nb_2O_{5-x}$ layer. That is not a monotonous process, however, since lower, non-conducting manganese oxide phases ($Mn_2O_3$, $Mn_3O_4$, MnO) form in the vicinity of the $MnO_2$/$Nb_2O_5$ interface and suppress the further diffusion of oxygen from the $MnO_2$ cathode to the semiconducting $Nb_2O_{5-x}$ layer. That then leads to an increase in the lacking areas x, an accelerated rise in the residual current and, finally, to the failure of the capacitor (Y. Pozdeev on CARTS-EUROPE '97: 11th European Passive Components Symposium). For that reason, niobium capacitors are said to have a markedly shorter life than tantalum capacitors.

That semiconducting behaviour of the anodically produced barrier layer on niobium has the result that, in order to measure correct capacitance values for niobium anodes, which are later achieved also in the finished capacitor, a positive BIAS voltage must be applied thereto. Otherwise a meaningful measurement is not possible and values are simulated that are much too high.

By comparative measurements of the capacitance of anodes of niobium metal or niobium(II) oxide and also niobium/tantalum alloys (90:10, 80:20, 70:30) and the capacitors produced therefrom, it has been found that the application of a BIAS voltage of $\geq 1.5$ V at the anode is necessary in order to measure for the anodes correct capacitance values, which are also found again later in the finished capacitor, and that capacitances of such anodes measured without an applied BIAS voltage are higher by a factor of from 3 to 4 than those measured with a BIAS voltage of at least 1.5 V, that is to say incorrect values are simulated. Accordingly, values are also obtained for the specific residual current that are lower by a factor of from 3 to 4 than the actual specific residual current when reference is made to capacitances measured without BIAS.

A very important parameter for the suitability of a powder as capacitor material is its chemical purity, since both metallic and non-metallic impurities can lead to faults in or to reduced stability of the dielectric layer. The elements Na, K, Fe, Cr, Ni and C in particular are to be regarded as critical for the residual current of tantalum anodes. As a result of continuous improvements to Ta powders, such impurities in powders produced by sodium reduction of $K_2TaF_7$ are nowadays in the region of the detection limit.

By contrast, the corresponding process via $K_2NbF_7$ is not available for the production of highly pure niobium powders because, owing to the high aggressivity of the corresponding heptafluoroniobate salts, the retort material is partly dissolved and the niobium powders so obtained are contaminated with large amounts of Fe, Cr, Ni, etc., So-called EB powders, which are produced by embrittling with hydrogen a niobium ingot melted by means of an electron beam, grinding it and subsequently dehydrating it, are also not suitable for the production of high-capacitance Nb capacitors. If the above-described grinding is carried out in an attritor under, for example, alcohols, niobium flakes are obtained which, however, in most cases contain a very high degree of metallic impurities, such as Fe, Cr, Ni and C, which are trapped in the niobium powder during the grinding operation by mechanical alloying and cannot be washed out later with mineral acids.

However, a very high degree of purity is exhibited by the niobium powders obtained by published proposals of the Applicants according to DE 19831280 A1 or WO 00/67936 by the two-stage reduction of niobium pentoxide with hydrogen or gaseous magnesium. Such powders contain, for example, metallic impurities such as Fe, Cr, Ni, Al, Na, K in amounts<25 ppm.

In addition to chemical purity, which is of decisive importance for the electrical properties, a capacitor powder must also meet some requirements in respect of physical properties. For example, it must have a certain flowability, so that it can be processed using the capacitor manufacturers' fully automated anode presses. Furthermore, a certain green strength of the pressed anode bodies is necessary so that they do not immediately fall apart again, and a sufficiently high pore distribution is required in order to ensure complete impregnation with manganese nitrate.

The object of the present invention is to overcome the above-described disadvantages of the known capacitors based on niobium. In particular, it is the object of the present invention to improve the insulating behaviour and the thermal stability of the niobium pentoxide barrier layer of capacitors based on niobium in such a manner that longer lives associated with higher capacitances and lower residual currents can be achieved for such capacitors.

It has now been found that such capacitors based on niobium exhibit markedly improved properties of the anodically produced oxide film if at least the barrier layer is alloyed/doped with vanadium. In particular, it has been found with the aid of impedance spectroscopic measurements and evaluation of Schottky-Mott diagrams that the concentration of lacking areas in anodically produced oxide layers of such capacitor anodes is markedly reduced and similarly low as in corresponding $Ta_2O_5$ layers. Moreover, there are the first signs of long-term stability comparable with that of tantalum anodes, which cannot be achieved with conventional capacitors based on niobium.

SUMMARY OF THE INVENTION

Accordingly, the invention provides capacitors having an anode based on niobium and a barrier layer based on niobium pentoxide, at least the barrier layer having a content of vanadium.

Capacitors based on niobium within the context of the present invention are capacitors having an anode of sintered finely divided powders based on niobium. By "based on niobium" is meant electrically conductive compounds and alloys whose principal component is niobium, as well as niobium metal. Suitable compounds are, for example, niobium oxides NbO, wherein x=from 0 to 2, niobium nitride, or niobium oxynitrides. Suitable niobium alloys are especially Nb/Ta alloys having a niobium content of at least 50 wt. %.

DETAILED DESCRIPTION OF THE INVENTION

Figure 1:
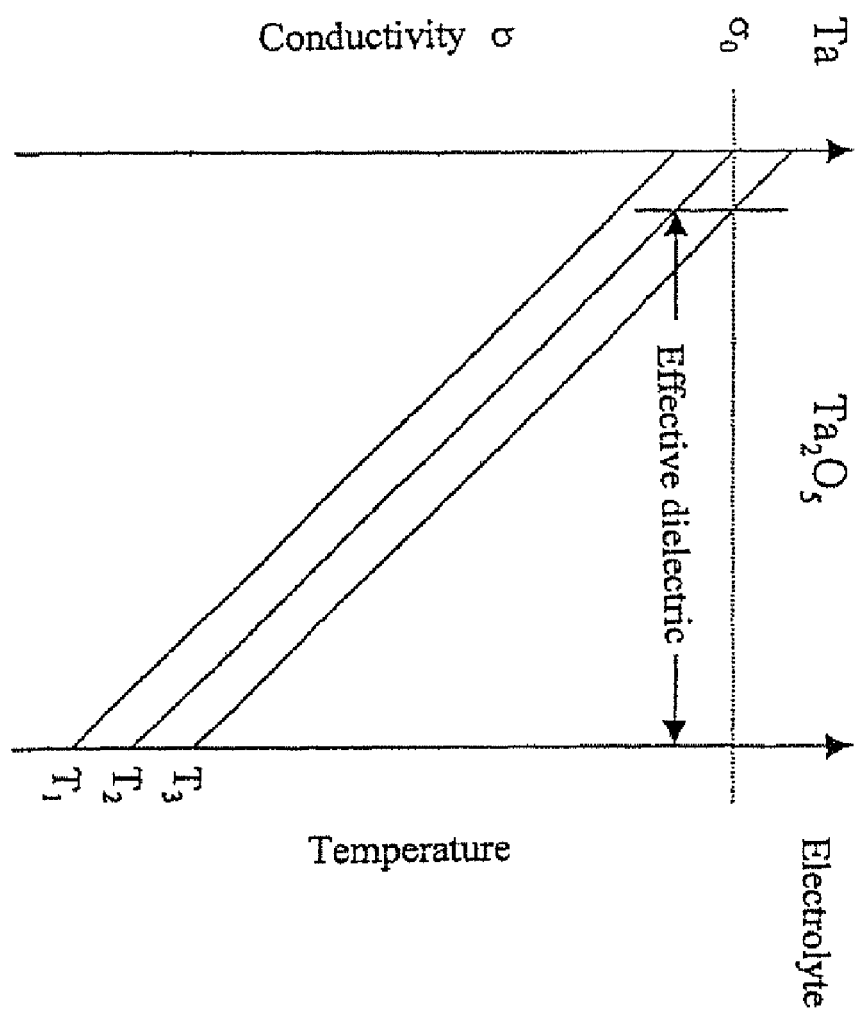
FIG. 1 diagrammatically shows the effect of temperature increase on conductivity, and further denotes the critical conductivity $\sigma_0$ where the semiconducting layer in the tantalum oxide film widens and the effective insulating layer becomes thinner, resulting in a change in the conducting behaviour of the oxide film from a dielectric to an n-type semiconductor.

The invention is described more fully hereunder with particular reference to its preferred embodiments. Preference is given according to the invention to niobium metal (having a preparation-dependent oxygen content of from 3000 to 4500 ppm per m$^2$ specific surface area) and NbO$_x$ wherein x=from 0.8 to 1.2.

Further preferred capacitors based on niobium have a niobium core, a niobium suboxide intermediate layer and a niobium pentoxide dielectric.

The vanadium content of such capacitors based on niobium is preferably from 10 to 100,000 ppm (mass), based on niobium and, optionally, tantalum. The content of vanadium is especially preferably from 200 to 20,000 ppm.

The capacitor anodes according to the invention based on vanadium-containing niobium are distinguished by a substantially bias-independent capacitance, that is to say an anodically connected direct voltage on which the alternating voltage is superimposed for measurement of the capacitance. The invention also provides capacitor anodes based on niobium that contain vanadium. The anodes preferably contain from 10 to 100,000 ppm vanadium, based on niobium and, optionally, tantalum. The vanadium content is especially preferably from 200 to 20,000 ppm.

The invention also provides powders based on niobium that contain from 10 to 100,000 ppm, preferably more than 200 ppm, especially preferably from 500 to 20,000 ppm, vanadium, based on niobium and, optionally, tantalum.

Also preferably, the powders based on niobium have impurity contents of Fe, Cr, Ni, Al, Na and K in amounts of less than 25 ppm in each case, especially preferably of less than 100 ppm in total.

The invention also provides a preferred process for the preparation of the powders according to the invention based on niobium and doped/alloyed with vanadium. The process comprises mixing vanadium, a vanadium oxide, or a vanadium compound that can be hydrolysed or decomposed thermally to vanadium oxides, in solid or dissolved form, with Nb, Nb$_2$O$_5$, NbO$_2$ or niobium oxide hydrate Nb$_2$O$_5$*xH$_2$O powder in the appropriate ratio, calcining the mixture, optionally after it has been dried, and then reducing the mixed oxide to the suboxide or metal and, optionally, carrying out nitridation.

Suitable vanadium compounds are all vanadium oxides such as V$_2$O$_5$, VO$_2$, V$_2$O$_3$ and VO, with V$_2$O$_5$ being especially preferred. Also suitable are all vanadium compounds that can be hydrolysed or decomposed thermally to oxides, such as, for example, ammonium metavanadate, vanadium(IV) oxide acetylacetonate, vanadiumn(IV) oxide sulfate pentahydrate, vanadium halides, etc. Ammonium metavanadate is especially preferred.

There are used as the niobium component preferably finely divided powders of Nb$_2$O$_2$, especially preferably niobium oxide hydrate Nb$_2$O$_5$*xH$_2$O.

Suitable niobium powders are especially highly porous powders which have been obtained in the manner described by published proposals of the Applicants according to U.S. Pat. No. 6,171,363 B1, DE 19831280 A1, DE 19847012 A1 and WO 00/67936 by reduction of niobium pentoxide in liquid or gaseous magnesium, optionally after previous reduction to the suboxide by means of hydrogen. Such niobium metal powders are obtained with extremely low contents of impurities that are harmful for capacitor applications.

If the calcination with vanadium oxides is carried out using Nb$_2$O$_5$ or Nb$_2$O$_5$*xH$_2$O, the reduction for the preparation of vanadium-containing NbO$_2$ can be carried out by heating in a hydrogen atmosphere at from 950 to 1500° C.

The reduction of vanadium-containing NbO$_2$ or Nb$_2$O$_5$ to the vanadium-containing Nb metal powder is preferably carried out according to DE 19 831 280 A1, DE 19 847 012 A1 or PCT/US99/09 772. Preference is given to reduction by means of magnesium vapour under a protecting gas atmosphere in a fixed bed. The reduction takes place especially preferably in a fluidised bed with argon as the carrier gas, the carrier gas being passed, before being introduced into the fluidised-bed reactor, over a magnesium melt at a temperature close to the boiling temperature of the magnesium.

The reduction of the calcination product of Nb$_2$O$_5$ or Nb$_2$O$_5$*xH$_2$O and vanadium oxide or V-containing NbO$_2$ to vanadium-containing NbO may also advantageously be effected by mixing the vanadium-containing NbO$_2$ or Nb$_2$O$_5$ powder with Nb metal powder (preferably also containing vanadium) and subsequently heating in a stream of hydrogen or in vacuo at temperatures of from 950 to 1600° C.

In order to prepare nitridated or oxynitridated vanadium-containing powders based on niobium, the vanadium-containing niobium metal powder or NbO$_x$ powder, preferably wherein x=0.1 . . . 0.5, is heated in a nitrogen-containing atmosphere at up to 1000° C.

The capacitor powders according to the invention based on niobium preferably have primary particle sizes of from 300 to 1500 nm, especially preferably from 400 to 600 nm. The powders are preferably used in the form of agglomerates having particle sizes from 40 to 400 μm. In order to adjust the agglomerate size, it is possible to carry out deoxidising agglomeration in a manner known per se by heating at from 800 to 1000° C. in the presence of a small amount of magnesium, followed by grinding through a sieve having a mesh size of from 250 to 400 μm.

Further processing to capacitor anodes is effected by pressing and sintering at from 1050 to 1350° C. to a sintered density of from 50 to 70% volume ratio.

Further processing of the anodes to capacitors is effected by "anodisation", that is to say electrochemical generation of the pentoxide layer in an electrolyte, such as dilute phosphoric acid, to the desired anodisation voltage, from 1.5 to 4 times the desired working voltage of the capacitor.

The following are illustrative but non-limiting examples of the invention.

EXAMPLES

Test Conditions

The production, forming and measurement of the anodes described in the following Examples were carried out according to the following parameters, unless expressly stated otherwise in the Examples.

Anode Production:

| | |
|---|---|
| Weight without wire: | 0.072 g |
| Diameter: | 3.00 mm |
| Length: | 3.25 mm |
| Compressed density: | 3.14 g/cm$^3$ |

Anode Sintering:

| | |
|---|---|
| 1250° C. | 20 minutes |
| 1450° C. | 20 minutes |
| 1600° C. | 20 minutes |

Anodisation:

| | |
|---|---|
| Forming voltage: | 40 V or 60 V (see Examples) |
| Forming current: | 100 mA/g |
| Complete forming time: | 2 h or 4 h (see Examples) |
| Electrolyte: | 0.1% H$_3$PO$_4$ (conductivity 25° C.: 2.5 mS/cm) |
| Temperature; | 80° C. |

Measurement of Capacitance:

| | |
|---|---|
| Electrolyte: | 18% H$_2$SO$_4$ |
| Temperature: | 23° C. |
| Frequency: | 120 Hz |
| BIAS: | 1.5 V (where applied) |

Measurement of Residual Current:

| | |
|---|---|
| Electrolyte: | 18% H$_2$SO$_4$ |
| Temperature: | 23° C. |
| Charging time: | 2 minutes |
| Voltage: | 70% of the forming voltage (28 or 42 V) |

Example 1

A niobium-vanadium alloy containing 0.894% vanadium was prepared as follows: 897.9 g of niobium oxide hydrate Nb$_2$O$_5$*xH$_2$O (Nb$_2$O$_5$ content 63.09%) were intimately mixed with 9.2 g of ammonium metavanadate NH$_4$VO$_3$ dissolved in 1000 ml of H$_2$O, then dried for 24 hours at 110° C. and then calcined for 3.5 hours at 950° C. The Nb$_2$O$_5$×H$_2$O had a primary particle size of approximately 600 nm. The mixed oxide so prepared was then introduced into molybdenum boats and maintained at 1450° C. for 4 hours under a slowly flowing hydrogen atmosphere. The suboxide so obtained had the composition NbO$_2$ (X-ray diffraction) and contained 0.716% vanadium. The product was then placed on a fine-mesh grid beneath which there was arranged a crucible containing magnesium in a 1.1 times stoichiometric amount, based on the oxygen content of the suboxide, and heated for 6 hours at 1000° C. under argon. During that time, the magnesium evaporated off and reacted with the suboxide located above it. After cooling the oven to room temperature, air was slowly supplied for passivation of the metal surface. The reduction product was subsequently washed with sulfuric acid and then washed neutral with demineralised water and dried.

Analysis of the Niobium Powder Gave a Content of:

V of 8940 ppm

O of 15,000 ppm (3289 ppm/m$^2$)

N of 342 ppm

Mg of 190 ppm

C of 33 ppm

Fe, Cr, Ni, Al, Ta each <20 ppm

The specific surface area of the powder according to BET was 4.56 m$^2$/g. In the X-ray diffraction, reflexes displaced only slightly at relatively small angles were to be detected for niobium, which indicates a solid solution of vanadium in niobium.

From that Nb—V alloy powder (powder A) and from a niobium powder prepared according to published proposals of the Applicants according to DE 19831280 A1 (powder B, comparison sample) and having the following contents:

V of <1 ppm

O of 16,000 ppm (3883 ppm/m$^2$)

N of 180 ppm

Mg of 300 ppm

Σ (Fe, Cr, Ni)<15 ppm

C 14 ppm and having a specific surface area according to BET of 4.32 m$^2$/g, anodes were produced, sintered at 1150° C. and formed at 40 V. The specific surface area according to BET (Quantasorb) was determined as 0.83+0.2 m$^2$/g on a number of anodes prior to forming.

Tables 1 and 2 show the measurement of the specific capacitances for anodes of the two powders in various electrolytes at various BIAS voltages:

TABLE 1

Measurement in 18% $H_2SO_4$

| | Electrolyte | | | | | |
|---|---|---|---|---|---|---|
| | Powder A | | | Powder B | | |
| | BIAS | | | | | |
| | 0 V | 2 V | 4 V | 0 V | 2 V | 4 V |
| meas. capacitance µF | 241 | 241 | 241 | 881 | 238 | 235 |
| spec. capacitance µFV/g | 133889 | 133889 | 133889 | 489444 | 132222 | 130556 |
| meas. residual current µA | | 2.97 | | | 3.04 | |
| spec. residual current nA/µFV | 0.31 | 0.31 | 0.31 | 0.09 | 0.32 | 0.32 |

TABLE 2

Measurement in 10% $H_3PO_4$

| | Electrolyte | | | | | |
|---|---|---|---|---|---|---|
| | Powder A | | | Powder B | | |
| | BIAS | | | | | |
| | 0 V | 2 V | 4 V | 0 V | 2 V | 4 V |
| meas. capacitance µF | 159 | 159 | 159 | 559 | 151 | 149 |
| spec. capacitance µFV/g | 88333 | 88333 | 88333 | 310556 | 83889 | 82778 |
| meas. residual current µA | | 2.72 | | | 2.81 | |
| spec. residual current nA/µFV | 0.43 | 0.43 | 0.43 | 0.13 | 0.47 | 0.47 |

Example 2

A niobium-tantalum-vanadium alloy containing 1.26% vanadium was prepared as follows: 1104.3 g of niobium oxide hydrate $Nb_2O_5 \ast xH_2O$ ($Nb_2O_5$ content 67.1%) were intimately mixed with 322.7 g of tantalum oxide hydrate $Ta_2O_5 \ast xH_2O$ ($Ta_2O_5$ content 75.4%) and 28.93 g of ammonium metavanadate $NH_4VO_3$, then dried for 24 hours at 110° C. and then calcined for 12 hours at 1150° C. The mixed oxide so prepared was then introduced into molybdenum boats and maintained at 1500° C. for 6 hours under a slowly flowing hydrogen atmosphere. The suboxide so obtained had the composition $NbO_2$ (X-ray diffraction shows reflexes displaced only at relatively small angles for $NbO_2$) and contained 21.13% tantalum and 1.05% vanadium. The product was then placed on a fine-mesh grid beneath which there was arranged a crucible containing magnesium in a 1.2 times stoichiometric amount, based on the oxygen content of the suboxide, and heated for 4 hours at 1050° C. under argon. During that time, the magnesium evaporated off and reacted with the suboxide located above it. After cooling the oven to room temperature, air was slowly supplied for passivation of the metal surface. The reduction product was subsequently washed with sulfuric acid and then washed neutral with demineralised water and dried.

Analysis of the Nb/Ta/v alloy powder gave a content of:

Ta of 24.33%

V of 12,600 ppm

O of 12,325 ppm (3322 ppm/m²)

N of 92 ppm

Mg of 45 ppm

C of 24 ppm

Fe, Cr, Ni, Al each <20 ppm

The specific surface area of the powder according to BET was 3.71 m²/g. In the X-ray diffraction, reflexes displaced only slightly at relatively small angles were to be detected for niobium, which indicates a solid solution of tantalum and vanadium in niobium.

From that Nb—Ta—V alloy powder (powder A) and from a niobium-tantalum alloy powder prepared analogously but without the addition of ammonium metavanadate (powder B, comparison sample) and having the following contents:

Ta of 22.14%

V of <1 ppm

O of 13,120 ppm (3390 ppm/m²)

N of 112 ppm

Mg of 67 ppm

Σ (Fe, Cr, Ni)<15 ppm

C 41 ppm and having a specific surface area according to BET of 3.87 m²/g, anodes were produced, sintered at 1200° C. and formed at 40 V. The specific surface area according to BET (Quantasorb) was determined as 0.91+04 m²/g on a number of anodes prior to forming.

Tables 3 and 4 show the measurement of the specific capacitances for anodes of the two powders in various electrolytes at various BIAS voltages:

TABLE 3

Measurement in 18% $H_2SO_4$

| | Electrolyte | | | | | |
|---|---|---|---|---|---|---|
| | Powder A | | | Powder B | | |
| | BIAS | | | | | |
| | 0 V | 2 V | 4 V | 0 V | 2 V | 4 V |
| meas. capacitance µF | 379 | 379 | 379 | 1319 | 372 | 367 |
| spec. capacitance µFV/g | 210556 | 210556 | 210556 | 732778 | 206667 | 203889 |
| meas. residual current µA | | 7.0 | | | 8.4 | |
| spec. residual current nA/µFV | 0.46 | 0.46 | 0.46 | 0.16 | 0.56 | 0.57 |

TABLE 4

Measurement in 10% $H_3PO_4$

| | Electrolyte | | | | | |
|---|---|---|---|---|---|---|
| | Powder A | | | Powder B | | |
| | BIAS | | | | | |
| | 0 V | 2 V | 4 V | 0 V | 2 V | 4 V |
| meas. capacitance µF | 237 | 237 | 237 | 859 | 231 | 227 |
| spec. capacitance µFV/g | 131667 | 131667 | 131667 | 477222 | 128333 | 126111 |
| meas. residual current µA | 6.2 | | | 6.5 | | |
| spec. residual current nA/µFV | 0.65 | 0.65 | 0.65 | 0.19 | 0.70 | 0.72 |

Example 3

A niobium(II) oxide powder doped with vanadium (powder A) was prepared as follows: 657.3 g of a niobium-vanadium alloy powder prepared according to Example 1 and having the following purity and physical properties:

V of 6047 ppm

O of 14,500 ppm

Mg of 390 ppm

C of 44 ppm $\Sigma$ (Fe, Cr, Ni, Al, Ta)<25 ppm

N of 79 ppm specific surface area according to BET 4.34 m²/g, apparent density according to Scott 14.3 g/inch, flowability according to Hall Flow 22 s, particle size determination according to Mastersizer D10=65.1, D50=170.7, D90=292.7 µm were intimately mixed with 566.5 g of niobium pentoxide $Nb_2O_5$<45 µm having the following contents:

$\Sigma$ (Al, As, Ca, Co, Cr, Cu, Fe, Ga, K, Mg, Mn, Mo, Na, Ni, Pb, Sb, Si, Sn, Ta, Ti, W, V, Zr)<25 ppm C<10 ppm S<10 ppm and placed into a molybdenum boat. The latter was then heated for 6 hours at 1250° C. under weakly flowing hydrogen. The resulting product (sample A) had the composition NbO and had the following contents and physical properties:

V of 3110 ppm

O of 14.71%

Mg of 90 ppm

C of 14 ppm $\Sigma$ (Fe, Cr, N Al, Ta)<15 ppm

N of 45 ppm specific surface area according to BET 2.31 m²/g, apparent density according to Scott 13.9 g/inch³, flowability according to Hall Flow 29 s, particle size determination according to Mastersizer D10=22.3, D50=123.4, D90=212.7 µm.

In an analogous manner there was prepared, as comparison sample, from a niobium powder prepared by published proposals of the Applicants according to DE 19831280 A1 and having the following contents and physical properties:

V<1 ppm

O of 13,200 ppm

Mg of 386 ppm

C of 47 ppm $\Sigma$ (Fe, Cr, Ni, Al, Ta)<25 ppm

N of 84 ppm specific surface area according to BET 4.01 m²/g, apparent density according to Scott 13.6 g/inch³, flowability according to Hall Flow 30 s, particle size determination according to Mastersizer D10=44.7, D50=156.2, D90=283.9 µm and a niobium pentoxide $Nb_2O_5$<45 µm having the following contents:

$\Sigma$ (Al, As, Ca, Co, Cr, Cu, Fe, Ga, K, Mg, Mn, Mo, Na, Ni, Pb, Sb, Si, Sn, Ta, Ti, W, V, Zr)<25 ppm C<10 ppm S<10 ppm an undoped niobium(II) oxide NbO (powder B) having the following purity and physical properties:

V<1 ppm

O of 14.62%

Mg of 54 ppm

C of 14 ppm

Σ (Fe, Cr, Ni, Al, Ta)<20 ppm

N of 56 ppm specific surface area according to BET 2.47 m²/g, apparent density according to Scott 13.6 g/inch³, flowability according to Hall Flow 30 s, particle size determination according to Mastersizer D10=27.7, D50=131.9, D90=221.1 μm.

Anodes were pressed from the two powders, sintered for 20 minutes at 1350° C. and formed at 40 V. Table 5 shows the measurement of the specific capacitances for anodes of the two powders in 18% H₂SO₄ at various BIAS voltages:

|  | Electrolyte | | | | | |
|---|---|---|---|---|---|---|
|  | Powder A | | | Powder B | | |
|  | BIAS | | | | | |
|  | 0 V | 2 V | 4 V | 0 V | 2 V | 4 V |
| meas. capacitance μF | 346 | 346 | 346 | 1261 | 349 | 341 |
| spec. capacitance μFV/g | 192222 | 192222 | 192222 | 700556 | 193889 | 189444 |
| meas. residual current μA |  | 1.1 |  |  | 1.3 |  |
| spec. residual current nA/μFV | 0.08 | 0.08 | 0.08 | 0.03 | 0.09 | 0.10 |

Example 4

Niobium powders having various vanadium contents were prepared according to Example 1 (see Table below, powders 2 to 6). From those powders and from a niobium powder prepared according to DE 198 31 280 A1 (see Table below, powder 1), anodes were produced, sintered at 1150° C. and then formed at 40 V.

The Table below shows the results of the capacitance measurements for anodes of all six powders, which were carried out without and with 2.0 V applied BIAS voltage.

|  | 1 | 2 | 3 | 4 | 5 | 6 |
|---|---|---|---|---|---|---|
| O ppm | 13800 | 12000 | 15100 | 14800 | 15300 | 13200 |
| N ppm | <300 | <300 | <300 | <300 | <300 | <300 |
| H ppm | 225 | 189 | 315 | 237 | 262 | 201 |
| C ppm | 36 | 25 | 29 | 35 | 28 | 31 |
| Σ (Fe, Cr, Ni) | 9 | 7 | 9 | 6 | 8 | 8 |
| Mg ppm | 135 | 195 | 94 | 130 | 160 | 155 |
| V ppm | <1 | 77 | 298 | 371 | 644 | 942 |
| BET surface area m²/g | 4.01 | 3.39 | 4.36 | 4.11 | 4.21 | 3.53 |
| meas. capacitance μF without bias | 680 | 400 | 214 | 206 | 209 | 198 |
| meas. capacitance μF with bias | 214 | 194 | 205 | 200 | 207 | 198 |
| spec. capacitance μFV/g | 119450 | 107780 | 113890 | 111100 | 115000 | 110000 |
| meas. residual current μA | 4.4 | 4.2 | 4.3 | 4.7 | 4.1 | 4.0 |
| spec. residual current μA/g | 62 | 58 | 61 | 65 | 57 | 56 |

The invention claimed is:

1. Conductive niobium compounds selected from the group of NbOx, wherein x is from 0.8 to 1.2 or niobium oxynitrides, having a content of vanadium from 10 to 100,000 ppm.

2. Conductive niobium compounds of claim 1, having a content of vanadium from 500 to 10,000 ppm.

3. Conductive niobium compounds of claim 1, wherein the niobium compounds have an oxygen content of from 3,000 to 4,500 ppm per $m^2$ of specific surface area.

4. Conductive niobium compounds of claim 1, wherein the niobium compounds have an impurity content of Fe, Cr, Ni, Al, Na and K in amounts of less than 25 ppm for each element and less than a total of 100 ppm for all elements.

5. An anode based on the niobium compound of claim 1.

6. The anode of claim 5, based on niobium compound with BIAS-independent capacitance.

7. The anode of claim 5, wherein the vanadium is present as a surface coating.

* * * * *